(12) United States Patent
Yu et al.

(10) Patent No.: US 8,605,972 B2
(45) Date of Patent: Dec. 10, 2013

(54) AUTOMATIC IMAGE ALIGNMENT

(75) Inventors: Liangyin Yu, Fremont, CA (US); Ming-Chang Liu, San Jose, CA (US)

(73) Assignee: Sony Corporation, Tokyo (JP)

( * ) Notice: Subject to any disclaimer, the term of this patent is extended or adjusted under 35 U.S.C. 154(b) by 64 days.

(21) Appl. No.: 13/410,960

(22) Filed: Mar. 2, 2012

(65) Prior Publication Data
US 2013/0230220 A1 Sep. 5, 2013

(51) Int. Cl.
*G06K 9/00* (2006.01)
(52) U.S. Cl.
USPC .......................................................... 382/128
(58) Field of Classification Search
USPC .......................................................... 382/128
See application file for complete search history.

(56) References Cited

U.S. PATENT DOCUMENTS

| | | | |
|---|---|---|---|
| 6,664,956 B1 * | 12/2003 | Erdem | 345/419 |
| 7,020,347 B2 * | 3/2006 | Zhang et al. | 382/276 |
| 2004/0117163 A1 | 6/2004 | Rivara | |
| 2004/0119016 A1 | 6/2004 | Koehler et al. | |
| 2005/0180657 A1 | 8/2005 | Zhang et al. | |
| 2007/0127816 A1 | 6/2007 | Balslev et al. | |
| 2007/0291233 A1 | 12/2007 | Culbertson et al. | |
| 2008/0032328 A1 | 2/2008 | Cline et al. | |
| 2008/0082426 A1 | 4/2008 | Gokturk et al. | |
| 2008/0095465 A1 * | 4/2008 | Mullick et al. | 382/284 |
| 2008/0123927 A1 | 5/2008 | Miga et al. | |
| 2008/0166036 A1 | 7/2008 | Bloom et al. | |
| 2010/0322496 A1 | 12/2010 | Liu et al. | |

FOREIGN PATENT DOCUMENTS

WO 2011015822 A1 2/2011

* cited by examiner

*Primary Examiner* — Tom Y Lu
(74) *Attorney, Agent, or Firm* — Haverstock & Owens, LLP

(57) ABSTRACT

A method for automatically aligning images includes (a) determining initial correspondent point features between a first image and a second image, (b) creating a triangular meshes for the images from the initial correspondent point features within the images, and (c) refining point correspondence between the first and second images based on affine transformation estimation using the triangular meshes. The method may also include (d) creating refined triangular meshes for the images from the point correspondence refined in (c), and (e) determining coordinate alignment within the areas of pairs of correspondent triangles in the refined triangular meshes through interpolation of affine transformation on the pairs of correspondent triangles.

20 Claims, 11 Drawing Sheets
(8 of 11 Drawing Sheet(s) Filed in Color)

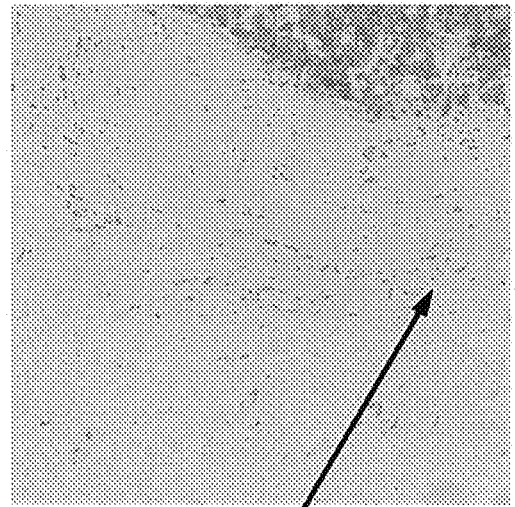
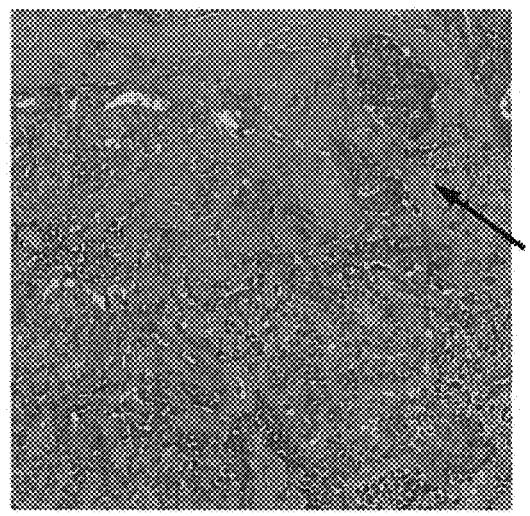
Fig. 3

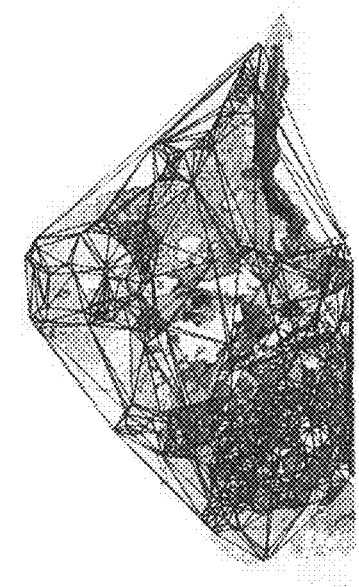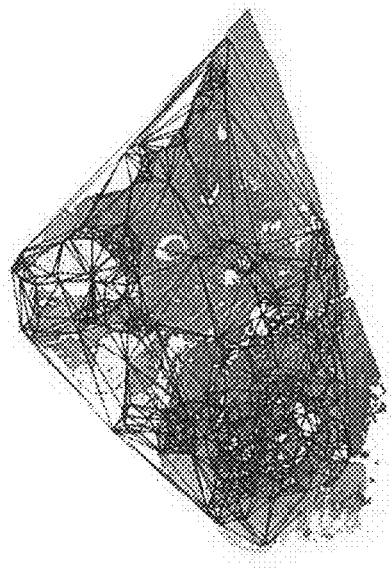
Fig. 8

Second Stage
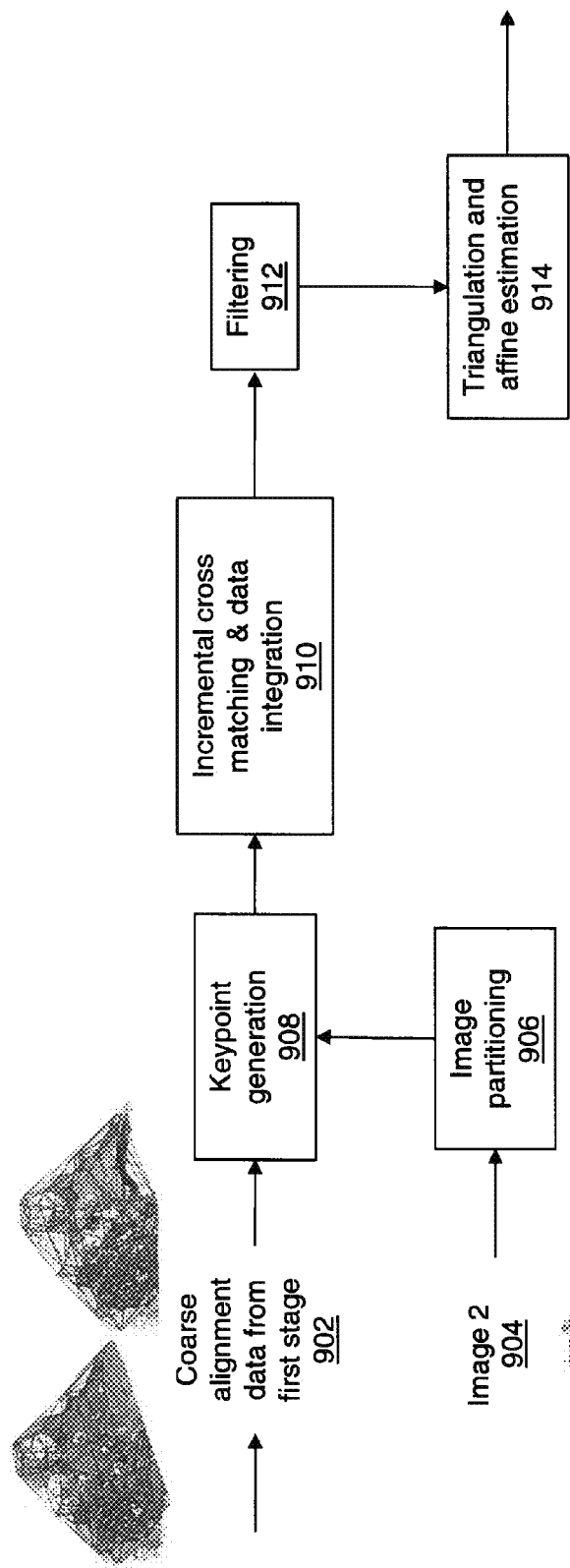
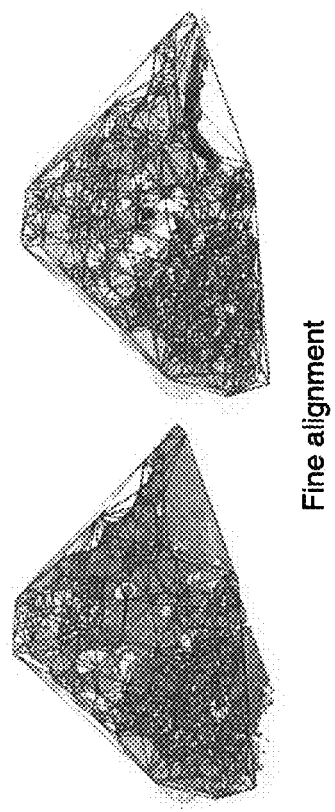
Fig. 9
Fine alignment

AUTOMATIC IMAGE ALIGNMENT

TECHNICAL FIELD

The present disclosure relates to methods and systems for automatically aligning images, for example, images of tissue samples stained by different methods.

BACKGROUND

Pathological diagnosis often involves slicing a tissue sample (e.g. a biopsy) into thin slices, placing the slices on individual slides, and staining the slices with different methods and reagents. For example, a tissue sample slice may be stained by hematoxylin and eosin (H&E) stain for visualizing histological structures of the sample, while an adjacent tissue sample slice may be stained by immunohistochemical (IHC) stain with a disease-specific antibody. Pathologists commonly perform initial diagnosis on H&E stained samples and then order IHC staining from the same biopsy block for validation and prognosis.

With the trend of digitization, specimen slides are often scanned into digital images (virtual slides) for later viewing on monitors. To make a final diagnosis, pathologists need to simultaneously examine the region of interest on an H&E image and its corresponding area on an IHC image(s) from the same biopsy block. Thus, those stain images need to be aligned on the monitor(s) such that simultaneous and synchronized viewing can be achieved across the images and the correspondent views are accurate regardless of magnification (FIG. 1).

To align such stain images is challenging, since there is often a great difference in image appearance between two adjacent sample slices stained by different methods, and various local deformations are involved. Adjacent samples are often not related by simple transformation, and structural changes are unpredictable across adjacent samples and different magnification. For example, two images obtained from adjacent but different parts of a tissue block may have ill-defined structural correspondences (see FIG. 2). And the stain images may have weak structures that need to be made explicit in order to align whole images (FIG. 3). Furthermore, because tissue slices may be stretched or deformed during sample handling, different parts of each image may transform differently from other parts of the same image (FIG. 4).

Existing systems for image alignment and navigation require the user to manually locate corresponding areas on the virtual slides (images) due to the problems discussed above. This process has to be redone when viewing in regions away from the alignment region and at different resolutions. For very large images (e.g. 100 k×100 k), this process becomes tedious and impractical. In addition, when the images are examined locally at a high resolution, the appearance between corresponding regions diverges rapidly and it becomes difficult to find matching points.

Therefore, there is a need to develop methods and systems for automatically aligning images which are similar in global appearance but have local deformations, for example, large images of tissue samples stained by different methods.

SUMMARY

The present disclosure includes an exemplary method for aligning images. Embodiments of the method include (a) determining initial correspondent point features between a first image and a second image, (b) creating triangular meshes for the images from the initial correspondent point features within the images, and (c) refining point correspondence between the first and second images based on affine transformation estimation using the triangular meshes. Embodiments of the method may also include (d) creating refined triangular meshes for the images from the point correspondence refined in (c), and (e) determining coordinate alignment within the areas of pairs of correspondent triangles in the refined triangular meshes through interpolation of affine transformation on the pairs of correspondent triangles.

An exemplary system in accordance with the present disclosure comprises a correspondence initiator to determine initial correspondent point features between a first image and a second image; a first triangulator to create triangular meshes for the images from the initial correspondent point features within the images; a correspondence refiner to refine point correspondence between the first and second images based on affine transformation estimation using the triangular meshes; a second triangulator to create refined triangular meshes for the images from the refined point correspondence; and a coordinate alignment generator to determine coordinate alignment within the areas of pairs of correspondent triangles in the refined triangular meshes through interpolation using affine transformation on the pairs of correspondent triangles.

The present disclosure includes an exemplary computer-readable medium storing instructions that, when executed, cause a computer to perform a method for aligning images, the method comprising: (a) determining initial correspondent point features between a first image and a second image; (b) creating triangular meshes for the images from the initial correspondent point features within the images; (c) refining point correspondence between the first and second images based on affine transformation estimation using the triangular meshes; (d) creating refined triangular meshes for the images from the point correspondence refined in (c); and (e) determining coordinate alignment within the areas of pairs of correspondent triangles in the refined triangular meshes through interpolation using affine transformation on the pairs of correspondent triangles.

Also provided is an exemplary computer system for aligning images, comprising: one or more processors configured to execute program instructions; and a computer-readable medium containing executable instructions that, when executed by the one or more processors, cause the computer system to perform a method for aligning images, the method comprising: (a) determining initial correspondent point features between a first image and a second image; (b) creating triangular meshes for the images from the initial correspondent point features within the images; (c) refining point correspondence between the first and second images based on affine transformation estimation using the triangular meshes; (d) creating refined triangular meshes for the images from the point correspondence refined in (c); and (e) determining coordinate alignment within the areas of pairs of correspondent triangles in the refined triangular meshes through interpolation of affine transformation on the pairs of correspondent triangles.

It is to be understood that both the foregoing general description and the following detailed description are exemplary and explanatory only and are not restrictive of the invention, as claimed.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 3 shows an example of weak structures in two adjacent tissue samples stained by H&E (left) and IHC (right), respectively.

FIG. 8 shows exemplary triangular meshes created based on the initial correspondent point features in an exemplary method for aligning two images.

FIG. 9 shows a flow chart illustrating an exemplary second stage of aligning two images.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

The methods and systems disclosed herein have many practical applications. For example, exemplary embodiments may be used to automatically align large images of tissue samples stained by different methods. By identifying matching points and modeling local deformation by local transformation, the methods and systems disclosed herein may achieve synchronized viewing in different resolutions and bring corresponding regions in the images into synchronization. The methods and systems disclosed herein may be used not only for purposes of pathological diagnosis, but also for aligning any images that are similar in global appearance but contain local changes or variance, for example, satellite images of the same scene from different viewpoints.

In the paragraphs that follow, the terms "IHC image" and "H&E image" are frequently used for illustrative purposes. They are meant to refer generally to any images to be aligned, and not to be limited literally to an IHC or H&E image.

Figure 1:
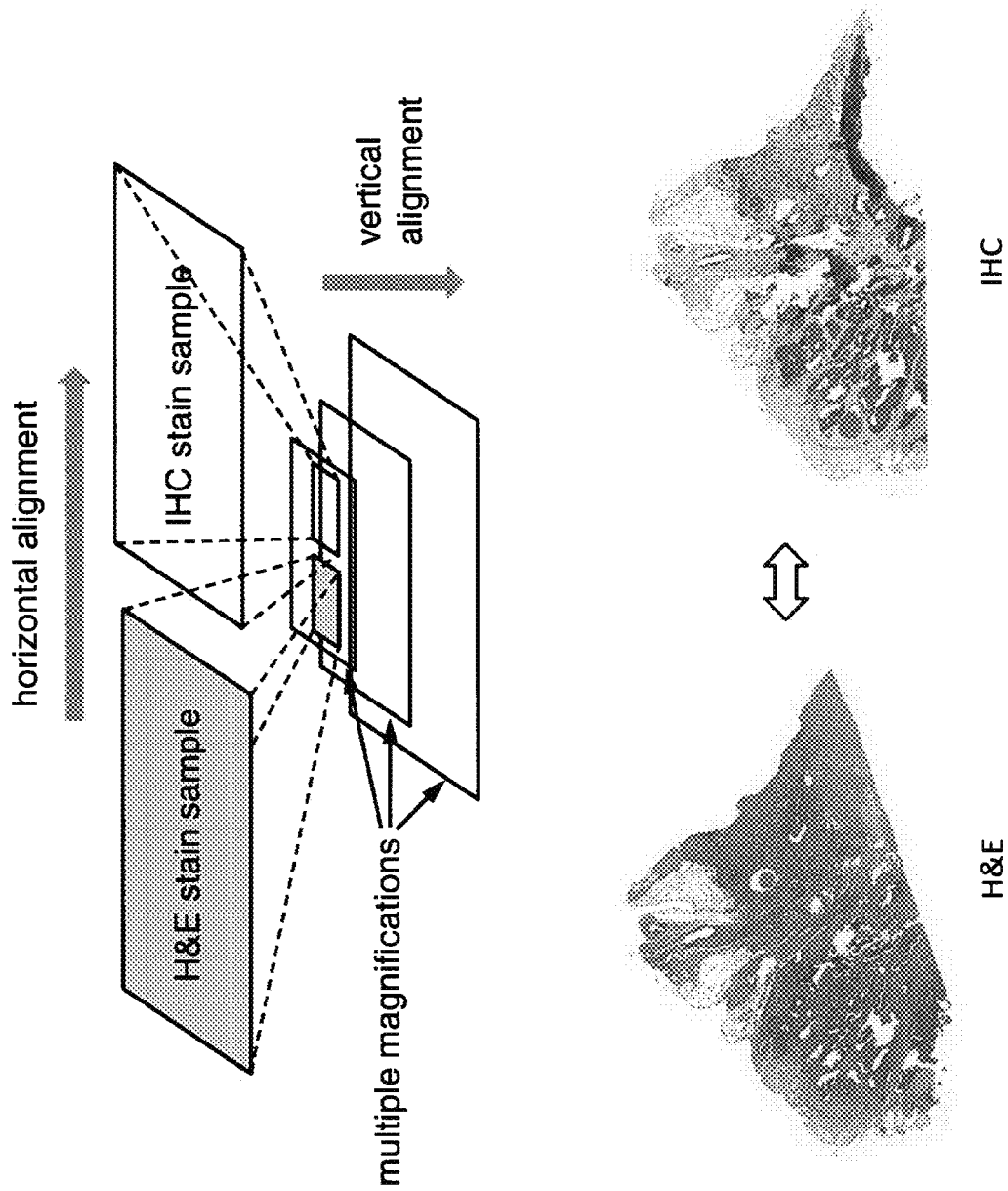
FIG. 1 illustrates alignment of images for purposes of pathological diagnosis.
Figure 2:
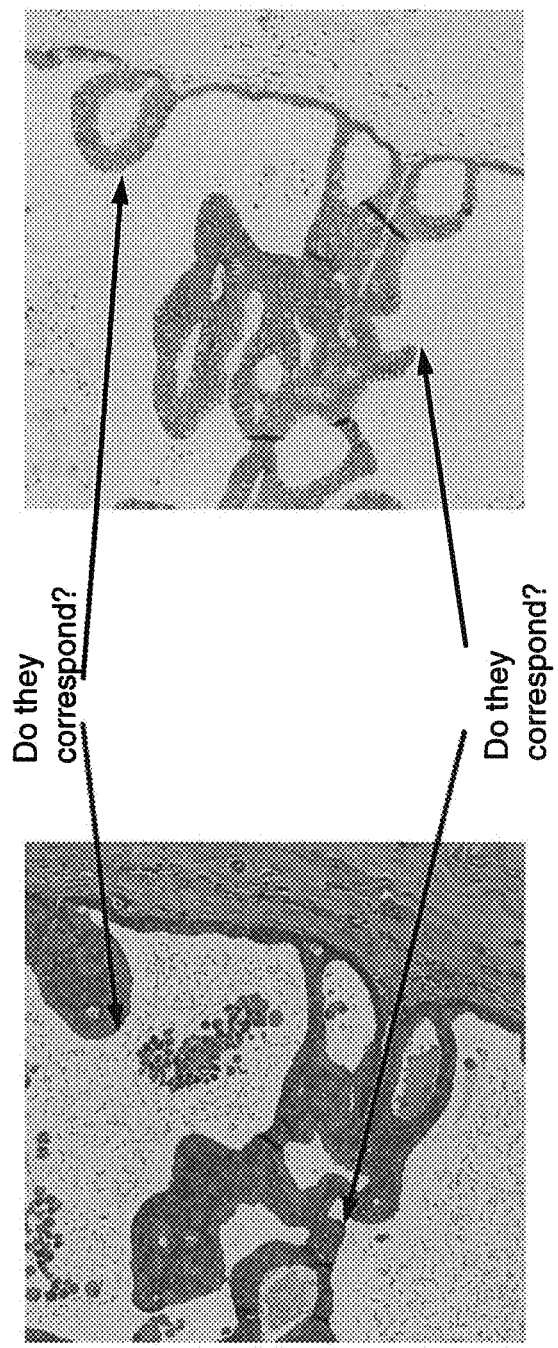
FIG. 2 shows an example of ill-defined structure correspondence between two adjacent tissue samples stained by H&E (left) and IHC (right), respectively.
Figure 4:
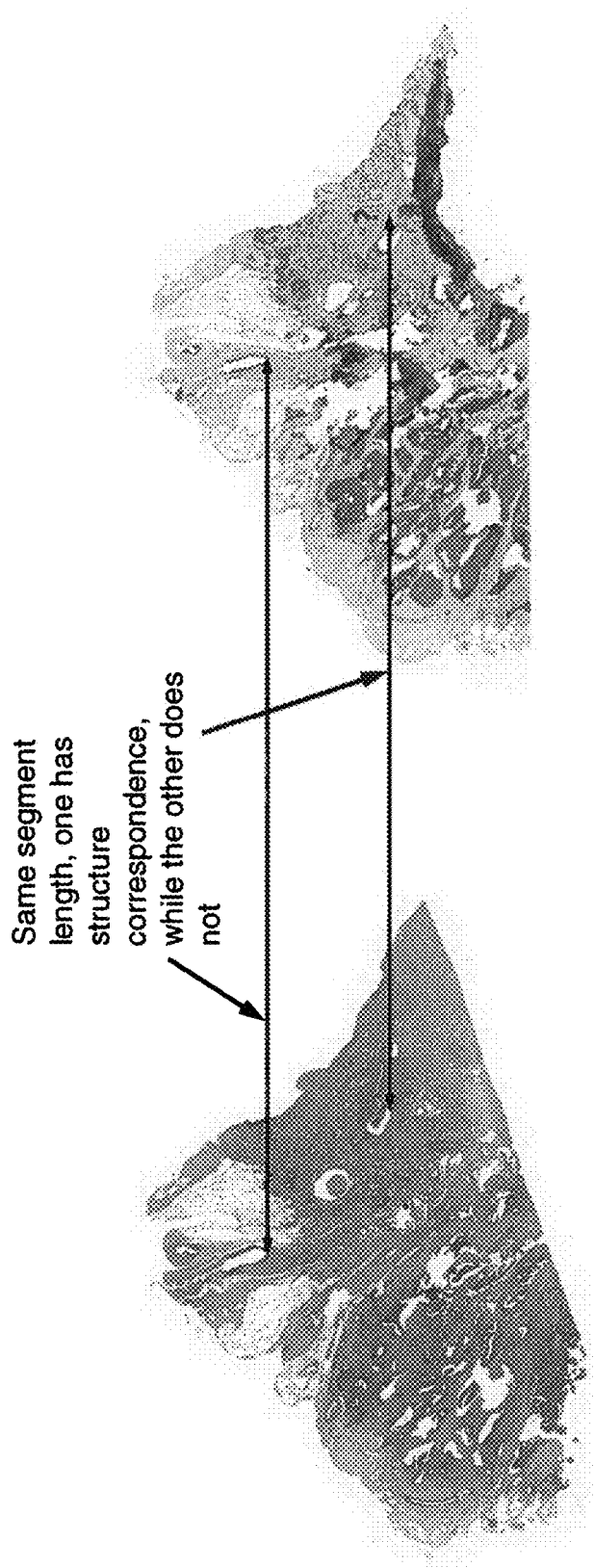
FIG. 4 shows an example of non-uniform transformation between two adjacent tissue samples stained by H&E (left) and IHC (right), respectively, due to tissue handling.
Figure 5:
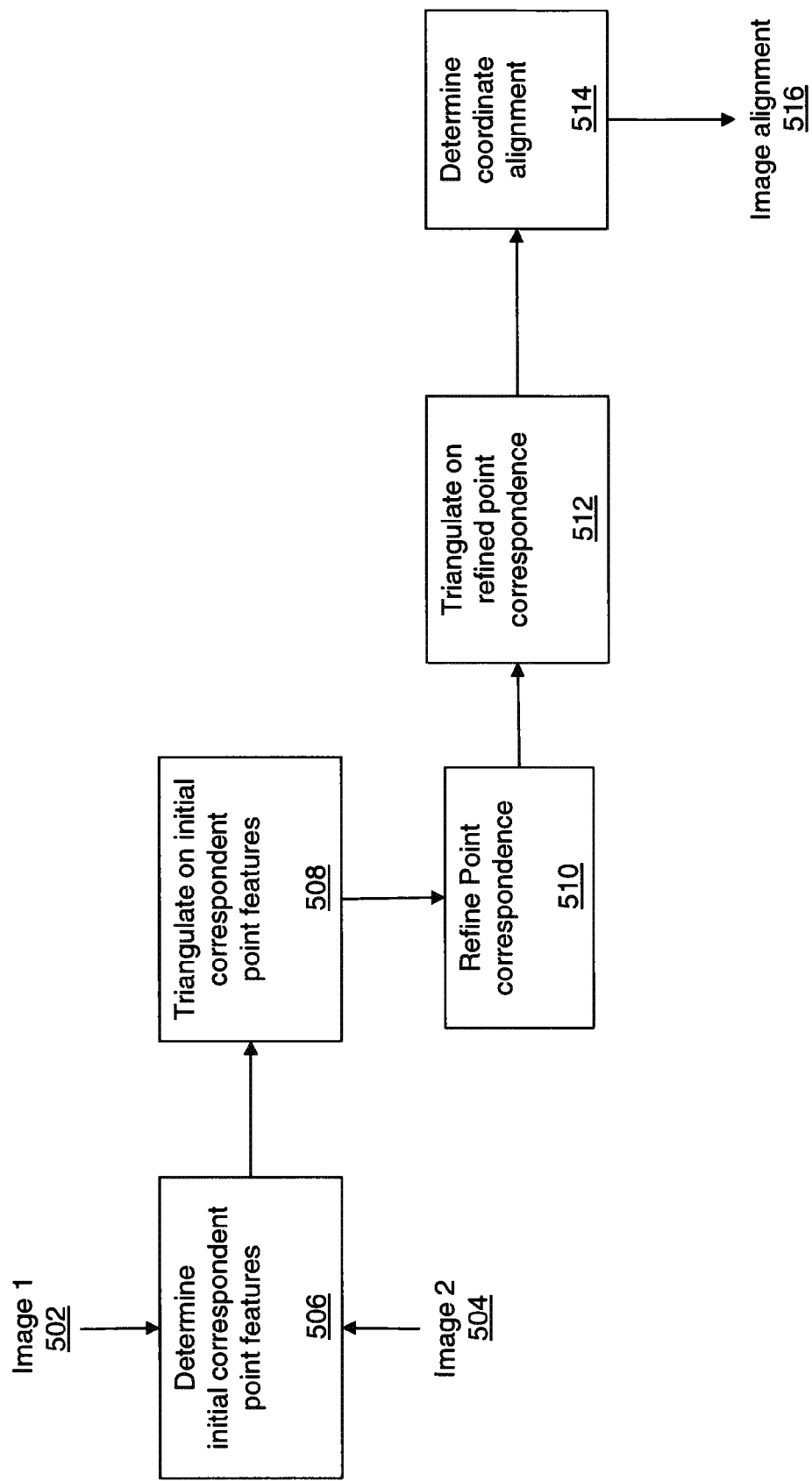
FIG. 5 shows a flow chart illustrating an exemplary method consistent with the presently-claimed invention.

FIG. 5 illustrates a flow chart of an exemplary method consistent with the presently-claimed invention. As shown in FIG. 5, initial correspondent point features between two images are determined (step 506). The images may be any images that are similar in global appearance but have local variations, such as images of adjacent tissue samples stained by different methods, for example, one stained by H&E stain and the other by IHC stain. In some embodiments, the images may be obtained from the same magnification, for example, images from 40× magnification. In some embodiments, the images may be down-sampled for purposes of processing.

Point features may be extracted from an image by an image processing algorithm, for example, maximum curvature along an image curve. Then correspondence of point features may be determined by cross matching the point features between two images.

Based on the initial correspondent point features, a triangular mesh may be created for each image (step 508), with each of the identified correspondent point features used as vertices of triangles. In some embodiments, the triangular meshes are Delaunay triangulations. It will be appreciated that at least three initial correspondent point features are to be identified by step 508 in order to create a triangular mesh.

Based on affine transformation estimation on the triangular meshes, point correspondence between the two images may be refined (step 510) to obtain a finer correspondence coverage of the images. Effectively, the affine transformation estimation allows coarse alignment of coordinates within corresponding triangles in the triangular meshes. As a result, additional and more accurate correspondent points may be identified.

Next, a refined triangular mesh may be created for each image based on the refined point correspondence (step 512). The refined triangular meshes may contain finer triangles and cover more spaces in the images than the triangular meshes created from the initial correspondent point features. In some embodiments, the refined triangular meshes are Delaunay triangulations. In some embodiments, the regions of an images not covered by the refined triangular meshes may be further processed to identify additional point correspondence, which may be used to improve the refined triangular meshes.

The refined triangular meshes may be used to determine coordinate alignment within each triangle between the two images (step 514). In some embodiments, an affine transformation may be computed for each pair of correspondent triangles, and coordinates for the area within the triangles may be aligned based on interpolation of the affine transformation data.

The entire images may be aligned based on the triangular meshes and the interpolated coordinate alignment within the triangles. The aligned coordinates (516), including coordinates aligned on the edges of the triangular meshes and coordinates aligned based on interpolation, may be stored in a database(s), including data structures, for rendition on a monitor(s) for synchronized viewing by the user.

Figure 6:
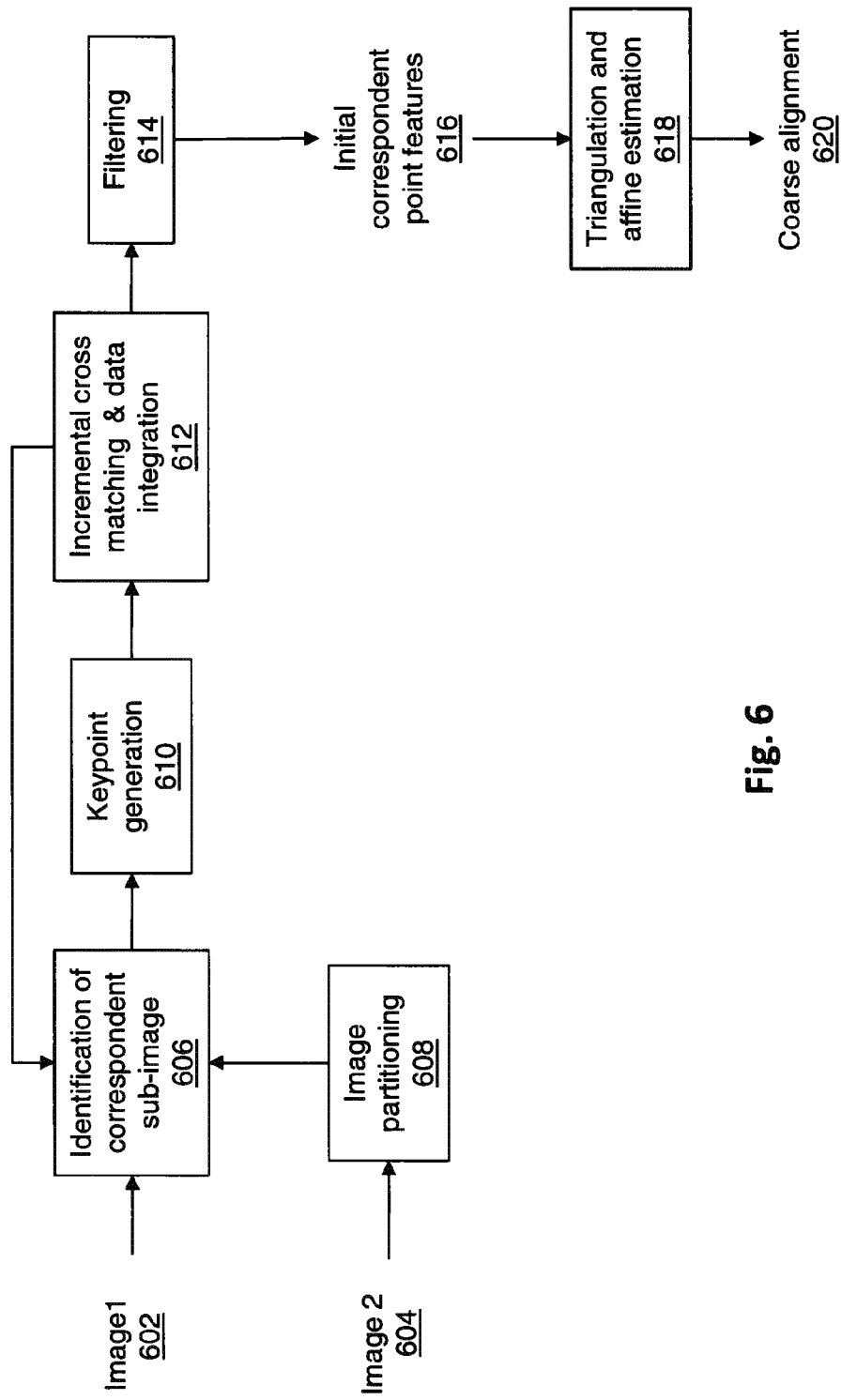
FIG. 6 shows a flow chart illustrating an exemplary first stage of aligning two images.

FIG. 6 shows a flow chart illustrating in more detail an exemplary first stage of aligning two images, including determining initial correspondent point features between two images and creating a triangular mesh for each image from the initial correspondent point features. As shown in FIG. 6, in some embodiments, the images may be partitioned into a plurality of sub-image windows, which may be individually processed to extract point features and to determine correspondence. Image partitioning may be based on any criteria fit for the image. For example, one of the images, such as an H&E stain image, may be partitioned based on the structural features of the image (step 608). In some embodiments, a structure map is extracted from the H&E stain image to identify the structural features for image partitioning. In some embodiments, the stain of H&E or other reagent(s) may be separated by a stain separation algorithm before the image is partitioned. In some embodiments, a sub-image window may be centered on a structural feature. The size of a sub-image window may be any size that is desirable for point feature extraction and/or correspondence determination, for example, 100×100, 200×200, 300×300, 400×400, 500×500, 600×600, 800×800, 900×900, or 1000×1000. In some embodiments, the size of the sub-image window may be 600×600, or 400×400.

In addition, the other image, for example, an IHC stain image, may be partitioned into correspondent sub-image windows of the same size (step 606). In some embodiments, to determine initial correspondent point features, the other image (e.g. an IHC image) may be partitioned based on direct image coordinate correspondence between the two images. For example, the center of a sub-image window of the H&E image may be mapped to an IHC image by direct image coordinate mapping, and a sub-image window of the same size may be determined in the IHC image based on the location of that center.

As further shown in FIG. 6, keypoints may be generated for sub-image windows (step 610) by analyzing the content of the sub-image windows. Any image processing method fit for the image may be used to generate keypoints, such as maximum curvature detection. As exemplified in FIG. 7A, in some embodiments, keypoints may be generated for each sub-image window in the IHC image based on maximum curvature detection after image segmentation.

Referring back to FIG. 6, the keypoints may be cross-matched in the correspondent sub-image window in the other image (step 612). In some embodiments, a small keypoint window, such as a 64×64 window centered on a keypoint, may be used to scan the correspondent sub-image window in the other image (e.g. an H&E image) to detect correspondence. In some embodiments, correspondence of a keypoint in the other image may be determined by cross correlation, for example, normalized cross correlation, of keypoint windows. Other image analysis methods for cross-matching purposes may also be used, for example, similarity-based or template matching. Once it is determined that there is correspondence, the keypoint in one image and its correspondent point in the other image are selected as initial correspondent point features and integrated into a set of initial correspondent point features for triangulation.

The cross-matching may be repeated for each keypoint until all the keypoints generated for the sub-image window have been processed. In some embodiments, the steps including identification of a correspondent sub-image window (606), keypoint generation (610), and cross-matching of keypoints (612) may be reiterated for each sub-image window of the partitioned image from step 608, for example, the partitioned H&E image.

In some embodiments, the sub-image windows in one image, for example, an H&E image, may be prioritized for processing based on a desirable criterion, for example, the density of the structural feature in the center of the sub-image window. In some embodiments, a sub-image window in the H&E image may be selected for processing according to the priority. Then its correspondent sub-image window may be identified in the IHC image. Within the identified window in the IHC image, keypoints are generated and matched against the corresponding sub-image window in the H&E image. Once all of the keypoints are exhausted for that pair of sub-image windows, a new sub-image window is selected from the H&E image according to the priority to repeat the process.

Figure 7:
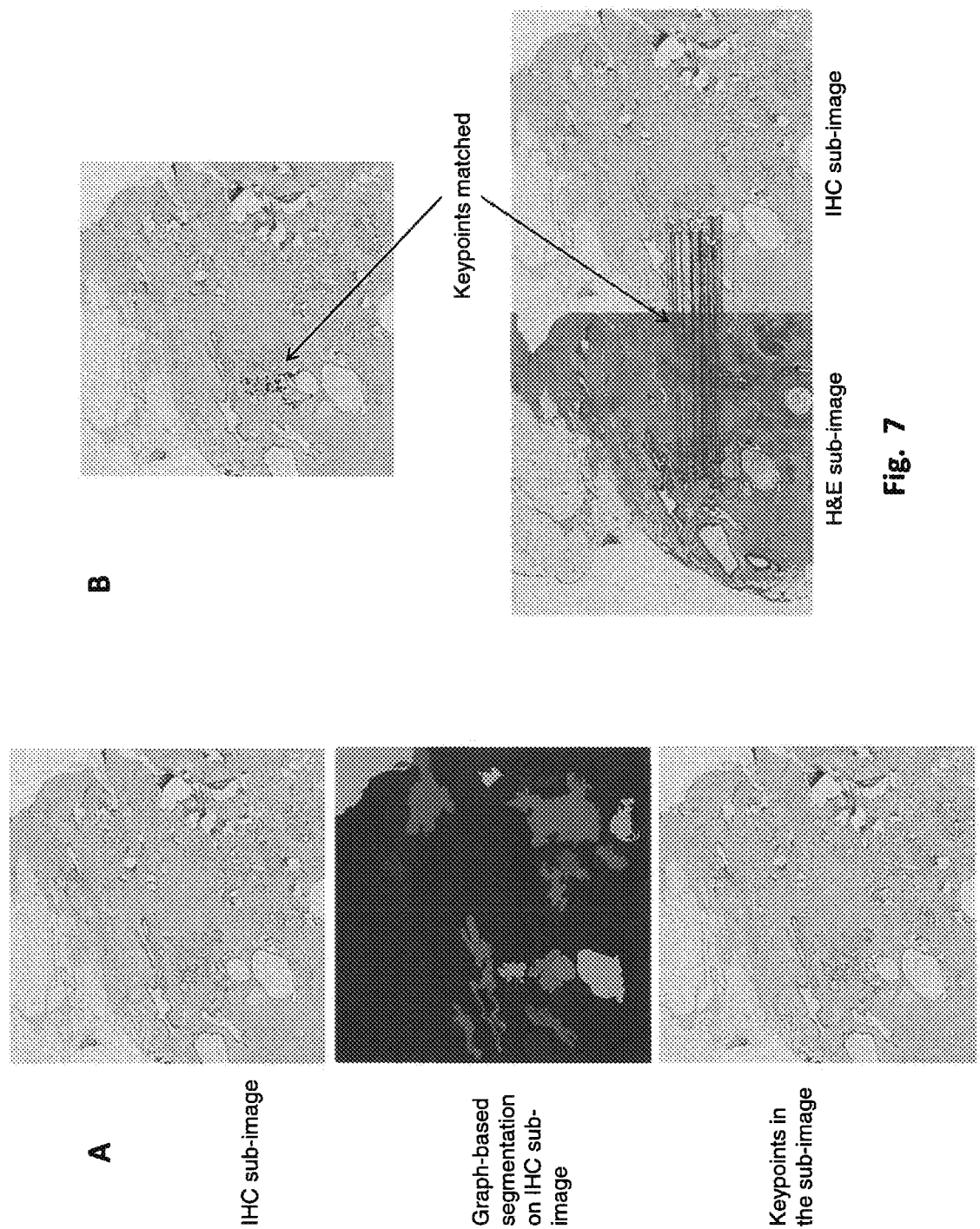
FIG. 7 shows exemplary keypoint generation (A), and keypoint cross-matching (B) during an exemplary first stage of aligning two images.

In some embodiments, the initial correspondent point features are filtered to eliminate false correspondent points (step 614). For example, line segments connecting correspondent points between two images may be drawn, as illustrated in FIG. 7B, lower panel. Theoretically the lines would be all parallel if the correspondent points are all true. Thus, a non-parallel line connecting correspondent points indicates that the correspondence is false and the correspondent points may be filtered out as false positives. Such filtering may be performed at a certain point of the process of image alignment, such as, for example, after each sub-image window is processed, during and/or after the determination of the initial correspondent point features, and/or after refining of point correspondence.

For each image, a triangular mesh is created from the initial correspondent point features identified for the image. In some embodiments, the triangular mesh is a Delaunay triangulation. FIG. 8 shows exemplary triangular meshes created from the initial correspondent point features in an H&E stain image (left) and an IHC stain image (right).

FIG. 9 shows a flow chart illustrating an exemplary second stage of aligning two images. At this stage, point correspondence may be refined based on affine transformation estimation using the triangular meshes obtained from the first stage. As shown in FIG. 9, the images may be again partitioned into a plurality of sub-image windows (step 906) as described above. For example, an H&E image may be partitioned based on structural features, and the sub-image windows may be each centered on a structure-feature point. The sub-image windows may be of any size that is desirable for refining point correspondence, for example, 100×100, 200×200, 300×300, 400×400, 500×500, 600×600, 800×800, 900×900, or 1000×1000.

In some embodiments, for each sub-image window, a correspondent sub-image window may be identified in the other image through affine estimation based on the triangular meshes created from the initial correspondent point features. For example, the center of a sub-image window in the H&E image may be mapped to the IHC image based on affine estimation from the triangle containing that center, and a correspondent sub-image window of the same size may be identified in the IHC image based on the mapped location.

In some embodiments, keypoints are generated for the correspondent sub-image window (step 908) as in the first stage described above. In some embodiments, keypoints may be generated for each sub-image window in the IHC image based on maximum curvature detection after image segmentation.

Similar to the first stage, the keypoints may be cross-matched in the correspondent sub-image window in the other image (step 910). In some embodiments, a small keypoint window, such as a 64×64 window centered on a keypoint, may be used to scan the corresponding sub-image window in the other image (e.g. an H&E image). Correspondence of a keypoint in the other image may be determined by, for example, normalized cross correlation, or other similar image analysis methods such as template matching. The matching keypoints having correspondence between the images are selected, filtered, and integrated into a set of correspondent points for refined triangulation. This cross-matching is repeated for each keypoint in the sub-image window and for each sub-image window of the partitioned image (from step 906).

In some embodiments, processing of the sub-image windows may be prioritized as described above for the first stage. In some embodiments, the selected correspondent points may be filtered to eliminate false positives, for example, after processing each sub-image window, or after processing all of the sub-image windows (step 912).

As shown in FIG. 9, refined triangular meshes may be created based on the refined point correspondence, that is, correspondent points identified from keypoint cross-matching described above. Compared to the triangular meshes obtained from the first stage, the refined triangular meshes obtained from the second stage may contain more vertices and finer triangles, and may cover more image spaces.

Figure 10:
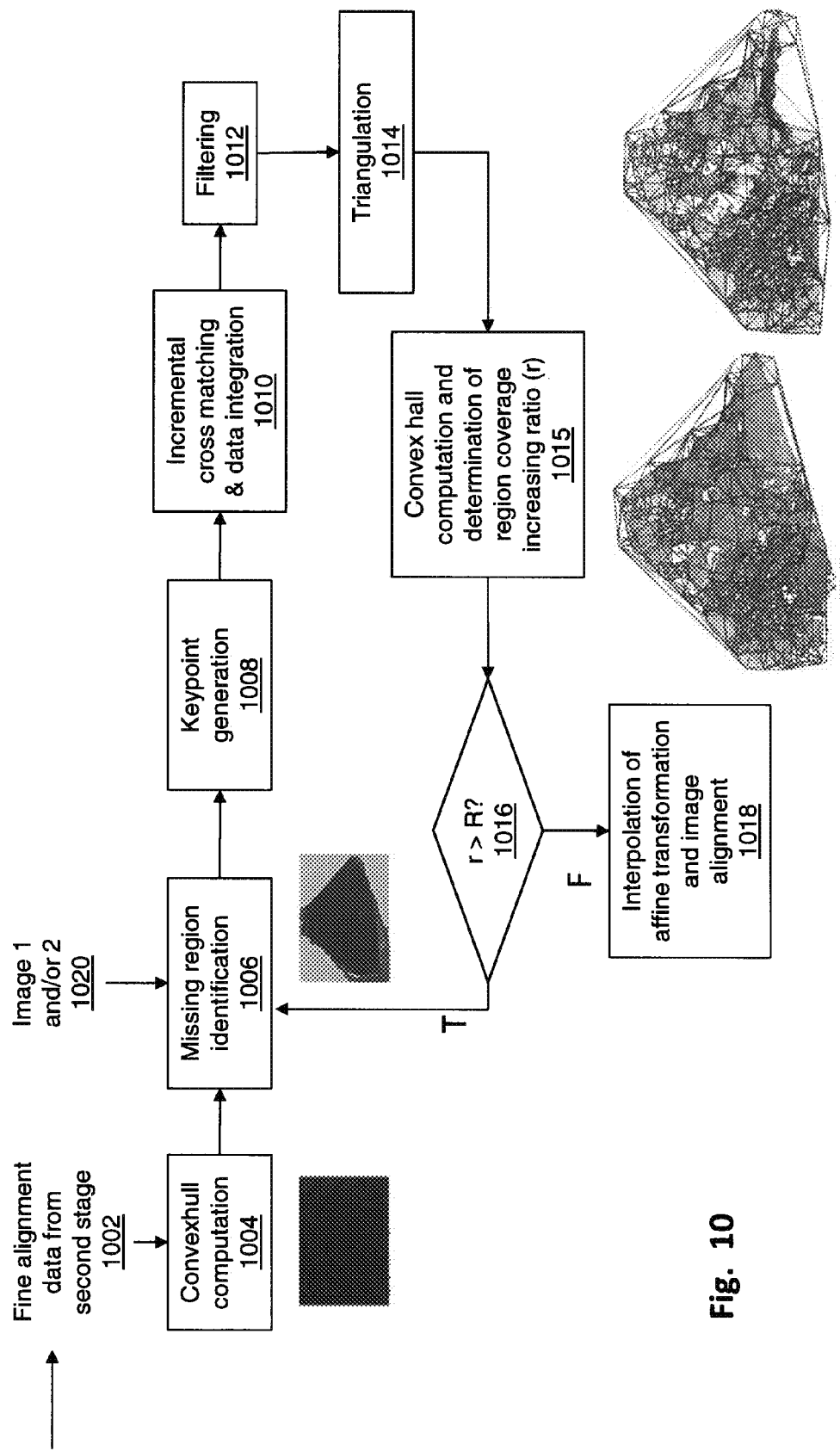
FIG. 10 shows a flow chart illustrating an exemplary third stage of aligning two images.

Some embodiments of the invention include a third stage to further refine the point correspondence and the triangular meshes with respect to peripheral regions of the images, as shown in the exemplary flow chart in FIG. 10. Additional correspondent points may be identified outside the refined triangular meshes obtained from the second stage, and the refined triangular meshes may be updated by incorporating the additional correspondent points.

As shown in FIG. 10, in some embodiments, a convex space (convex hull) may be computed for all of the correspondent points identified at the end of the second stage (step 1004). The peripheral regions that are not covered by the convex hull may contain blank background images, but some of the regions may show parts of the object of interest, such as a tissue sample, and thus may contain point features that can be used for image alignment. Those regions of the image that may contain information for image alignment but are not covered by the convex hull are referred to as "missing regions" in FIG. 10 and hereafter. In some embodiments, the convex hull may be subtracted from the image, and the content of the remaining image may be analyzed to identify missing regions (step 1006) for further image alignment. In some embodiments, the content of the remaining image may be analyzed with an image processing tool, such as image segmentation, for example, graph-based segmentation, to identify missing regions. In some embodiments, a convex hull is computed for the H&E image and the contents of the image outside the convex hull are analyzed by image segmentation to identify missing regions.

In some embodiments, a missing region may be partitioned into a plurality of sub-image windows as in the first or the second stage described above in order to generate new keypoints and identify additional correspondent points between the images. For example, a missing region in the H&E image may be partitioned based on structural features. Each of the sub-image windows may be mapped to the other image to identify correspondent sub-image windows. For example, a sub-image window in the H&E image may be mapped to the IHC image based on geometric location or affine mapping. In some embodiments, as in the first and the second stages, keypoints may be generated in the sub-image window in the IHC image (step 1008), then cross-matched to the correspondent sub-image window in the H&E image. Matching keypoints are selected as correspondent points between the images (step 1010), and filtered. The above process may be reiterated for each sub-image window in the missing region. After all of the missing regions have been processed, the new correspondent points identified in the missing regions may be filtered to eliminate false positives as described above (step 1012). The refined triangular meshes obtained from the previous stage may be updated to incorporate the new correspondent points (step 1014).

Referring to FIG. 10, in some embodiments, after all of the identified missing regions have been processed and the refined triangular meshes updated, a new convex hull may be computed based on the triangular meshes (step 1015). To determine the extent of alignment coverage increased by the missing regions, the areas of the new convex hull and the previous convex hull may be calculated and the region coverage increasing ratio (r) may be determined as the ratio of additional area coverage against the previous covered image area. If r is greater than a predetermined value R (step 1016), which may be, for example, 5%, 4%, 3%, 2%, 1%, 0.9%, 0.8%, 0.7%, 0.6%, 0.5%, 0.4%, 0.3%, 0.2%, 0.1%, or any other value fit for the purpose, the images may be processed again as described above to identify new missing regions outside the new convex hull and to identify additional correspondent points. In some embodiments, the predetermined value R may be 0.6%. The refined triangular meshes are again updated to incorporate any additional correspondent points identified in the new missing regions. In some embodiments, the process described above is iterated and the refined triangular meshes are updated to incorporate newly identified correspondent points until the region coverage increasing ratio (r) is not greater than the predetermined value R.

In some embodiments, the images may be optionally processed again to identify additional missing regions, in which point features outside the covex hull of the covering triangular mesh may be determined and matched between the images by different image matching method (s), for example, computational geometry methods. The refined triangular meshes may be further updated to incorporate the correspondent points thus identified.

Based on the refined triangular meshes, coordinates in one image may be mapped in the other image (step 1018). For example, for each pair of correspondent triangles in the refined triangular meshes, the coordinates at the vertices may be aligned by affine transformation, while the coordinates within each triangle may be aligned through interpolation of affine transformation at the vertices. In some embodiments, the refined triangular meshes obtained from the second stage may be used to align the coordinates as described above. The aligned coordinates may be stored in a data structure(s) and/ or a database(s). Alignment of the entire images may be generated based on the aligned coordinates for output, for example, rendering on a monitor or multiple monitors, printing, etc.

Tissue sample images, including IHC and H&E images, are merely exemplary images to be aligned. Any types of images consistent with disclosed embodiments may also be candidates for automatic image alignment disclosed herein. More than two images may be aligned using the methods and systems disclosed herein with modifications and changes without departing from the broader spirit and scope of the invention.

It is understood that the above-described exemplary process flows in FIGS. 5, 6, 9 and 10 are for illustrative purposes only. Certain steps may be deleted, combined, or rearranged, and additional steps may be added.

The methods disclosed herein may be implemented as a computer program product, i.e., a computer program tangibly embodied in a non-transitory information carrier, e.g., in a machine-readable storage device, or a tangible non-transitory computer-readable medium, for execution by, or to control the operation of, data processing apparatus, e.g., a programmable processor, multiple processors, a computer, or multiple computers. A computer program may be written in any appropriate form of programming language, including compiled or interpreted languages, and it may be deployed in various forms, including as a standalone program or as a module, component, subroutine, or other unit suitable for use in a computing environment. A computer program may be deployed to be executed on one computer or on multiple computers at one site or distributed across multiple sites and interconnected by a communication network.

A portion or all of the methods disclosed herein may also be implemented by an application-specific integrated circuit (ASIC), a field-programmable gate array (FPGA), a complex programmable logic device (CPLD), a printed circuit board (PCB), a digital signal processor (DSP), a combination of programmable logic components and programmable interconnects, a single central processing unit (CPU) chip, a CPU chip combined on a motherboard, a general purpose computer, or any other combination of devices or modules capable of performing automatic image alignment disclosed herein.

Figure 11:
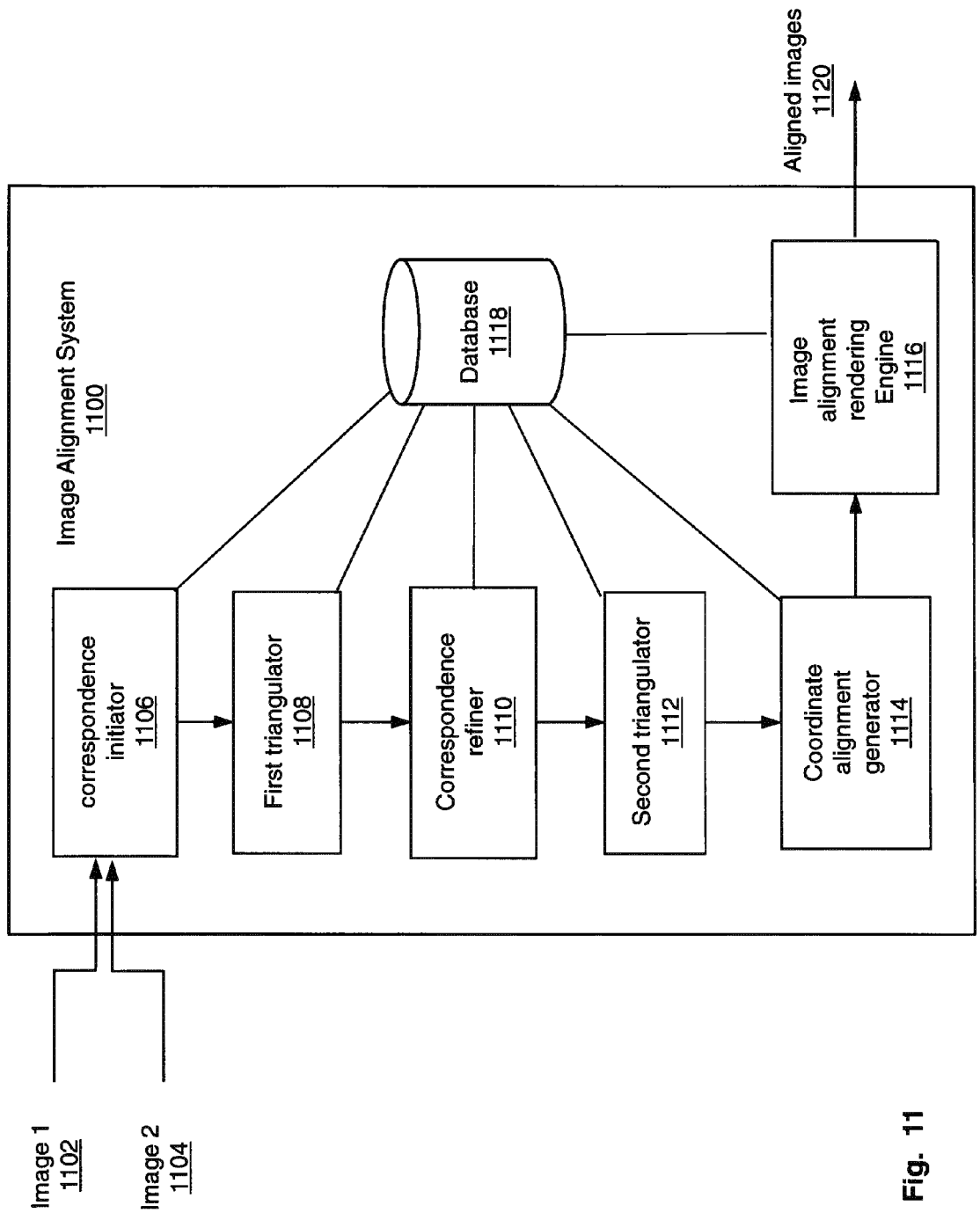
FIG. 11 illustrates a block diagram of an exemplary image alignment system consistent with the invention.

FIG. 11 illustrates a block diagram of an exemplary image alignment system 1100 consistent with the invention. As shown in FIG. 11, exemplary system 1100 may comprise a correspondence initiator 1106; a first triangulator 1108; a correspondence refiner 1110; a second triangulator 1112; and a coordinate alignment generator 1114.

With reference to FIG. 11, upon receiving the images to be aligned, the correspondence initiator 1106 may determine initial correspondent point features between the images as described above, for example, as described in the first stage of image alignment. The first triangulator 1108 then creates a triangular mesh for each image from the initial correspondent point features within said image.

Based on affine transformation estimation on the triangular meshes, the correspondence refiner 1110 refines point correspondence between the images as described above, for example, as described in the second stage of image alignment. The second triangulator 1112 may create a refined triangular mesh for each image from the point correspondence refined by the correspondence refiner.

Based on the refined triangular meshes, the coordinate alignment generator 1114 determines coordinate alignment at the vertices of each pair of correspondent triangles through affine transformation. The coordinate alignment generator may also determine coordinate alignment within the areas of each pair of correspondent triangles through interpolation of affine transformation on said pair of triangles.

In some embodiments, the exemplary system may further comprise a database 1118, which may be data structure(s) or a database management system, to store coordinate alignment information for the images. The database may also store any of the information generated or used during the process of image alignment. The exemplary system may further comprise an image alignment rendering engine 1116 to provide aligned images 1120 for output on a monitor or multiple monitors, such as computer monitors, TV monitors, or a printer, etc.

The system 1100 of FIG. 11 may be implemented as a computer system for aligning images, comprising: one or more processors configured to execute program instructions; and a computer-readable medium containing executable instructions that, when executed by the one or more processors, cause the computer system to perform a method for aligning images, the method comprising: (a) determining initial correspondent point features between a first image and a second image; (b) creating a triangular mesh for each image from the initial correspondent point features within said image; (c) refining point correspondence between the first image and the second image based on affine transformation estimation using the triangular meshes; (d) creating a refined triangular mesh for each image from the point correspondence refined in (c); and (e) determining coordinate alignment within the areas of each pair of correspondent triangles in the refined triangular meshes through interpolation of affine transformation on said pair of correspondent triangles.

In the preceding specification, the invention has been described with reference to specific exemplary embodiments. It will, however, be evident that various modifications and changes may be made without departing from the broader spirit and scope of the invention as set forth in the claims that follow. The specification and drawings are accordingly to be regarded as illustrative rather than restrictive. Other embodiments of the invention may be apparent to those skilled in the art from consideration of the specification and practice of the invention disclosed herein.

What is claimed is:

1. A computer-implemented method for aligning images, the method comprising the steps performed by one or more computers of:
   (a) determining initial correspondent point features between a first image and a second image;
   (b) creating triangular meshes for the images from the initial correspondent point features within the images;
   (c) refining point correspondence between the first and second images based on affine transformation estimation using the triangular meshes;
   (d) creating refined triangular meshes for the images from the point correspondence refined in (c); and
   (e) determining coordinate alignment within the areas of pairs of correspondent triangles in the refined triangular meshes through interpolation of affine transformation on the pairs of correspondent triangles.

2. The method of claim 1, wherein (a) determining initial correspondent point features comprises:
   generating keypoints in the first image;
   determining correspondence in the second image for the keypoints; and
   selecting the keypoints having correspondence in the second image as initial correspondent point features.

3. The method of claim 2, further comprising:
   partitioning the second image into a plurality of sub-image windows; and
   identifying correspondent sub-image windows in the first image;
   wherein generating keypoints comprises generating keypoints for correspondent sub-image windows in the first image.

4. The method of claim 1, further comprising filtering out false initial correspondent point features.

5. The method of claim 1, wherein the triangular meshes of (b) are Delaunay triangulations.

6. The method of claim 1, wherein (c) refining point correspondence comprises
   partitioning the second image into a plurality of sub-image windows;
   identifying in the first image correspondent sub-image windows based on affine transformation estimation using the triangular meshes of (b); and
   identifying correspondent points between the first and second images for corresponding sub-image windows in the first and second images.

7. The method of claim 6, wherein identifying correspondent points comprises
   generating keypoints for the correspondent sub-image windows in the first image;
   determining correspondence in the second image for the keypoints; and
   selecting the keypoints having correspondence in the second image as correspondent points.

8. The method of claim 7, further comprising filtering out false correspondent points.

9. The method of claim 6, further comprising:
   computing a convex space containing the correspondent points for one of the first and second images;
   identifying a missing region located outside the convex space in the one image; and
   identifying correspondent points in the missing region between the first and second images.

10. The method of claim 1, further comprising:
    generating image alignment based on the coordinate alignment and the refined triangular meshes.

11. The method of claim 1, wherein
the first image is an immunohistochemical (IHC) stain image; and
the second image is a hematoxylin and eosin (H&E) stain image.

12. The method of claim 2, wherein determining correspondence comprises normalized cross correlation.

13. The method of claim 3, wherein generating keypoints comprises maximum curvature detection after image segmentation on the first image.

14. The method of claim 7, wherein determining correspondence comprises normalized cross correlation.

15. An apparatus for aligning images, comprising:
an image correspondence initator to determine initial correspondent point features between a first image and a second image;
a first triangulator to create triangular meshes for the images from the initial correspondent point features within the images;
a correspondence refiner to refine point correspondence between the first and second images based on affine transformation estimation using the triangular meshes;
a second triangulator to create refined triangular meshes for the images from the refined point correspondence; and
a coordinate alignment generator to determine coordinate alignment within the areas of pairs of correspondent triangles in the refined triangular meshes through interpolation of affine transformation on the pairs of correspondent triangles.

16. The apparatus of claim 15, further comprising:
an image alignment rendering engine to generate image alignment based on the coordinate alignment and the refined triangular meshes.

17. The apparatus of claim 15, further comprising:
a database to store coordinate alignment information.

18. A non-transitory computer-readable medium storing instructions that, when executed, cause a computer to perform a method for aligning images, the method comprising:

(a) determining initial correspondent point features between a first image and a second image;
(b) creating triangular meshes for the images from the initial correspondent point features within said image;
(c) refining point correspondence between the first and second images based on affine transformation estimation using the triangular meshes;
(d) creating refined triangular meshes for the images from the point correspondence refined in (c); and
(e) determining coordinate alignment within the areas of pairs of correspondent triangles in the refined triangular meshes through interpolation of affine transformation on the pairs of correspondent triangles.

19. The non-transitory computer readable medium of claim 18, wherein the method further comprises:
generating image alignment based on the coordinate alignment and the refined triangular meshes.

20. A computer system for aligning images, comprising:
one or more processors configured to execute program instructions; and
a computer-readable medium containing executable instructions that, when executed by the one or more processors, cause the computer system to perform a method for aligning images, the method comprising:
(a) determining initial correspondent point features between a first image and a second image;
(b) creating triangular meshes for the images from the initial correspondent point features within said image;
(c) refining point correspondence between the first and second images based on affine transformation estimation using the triangular meshes;
(d) creating refined triangular meshes for the images from the point correspondence refined in (c); and
(e) determining coordinate alignment within the areas of pairs of correspondent triangles in the refined triangular meshes through interpolation of affine transformation on the pairs of correspondent triangles.

* * * * *